W. H. COLLINS.
GRAIN SPROUTER.
APPLICATION FILED NOV. 17, 1915.

1,209,938.

Patented Dec. 26, 1916.

WITNESSES:
John Darby
Louisa Loehr

W. H. Collins Inventor
By his Attorney
John D. Morgan

UNITED STATES PATENT OFFICE.

WALTER H. COLLINS, OF SUMMIT, NEW JERSEY.

GRAIN-SPROUTER.

1,209,938.   Specification of Letters Patent.   Patented Dec. 26, 1916.

Application filed November 17, 1915. Serial No. 61,883.

*To all whom it may concern:*

Be it known that I, WALTER H. COLLINS, a citizen of the United States, and a resident of Summit, in the county of Union and State of New Jersey, have invented certain new and useful Improvements in Grain-Sprouters, of which the following is a specification.

The invention relates to a sprouter for oats, or like grain, which grain is to be used in feeding poultry, that is, a device or apparatus for holding the grain and permitting it to be soaked with water from time to time to cause the grain to sprout preparatory to its being fed to the poultry.

Objects of the invention will be set forth hereinafter in part, and in part will be obvious herefrom, such objects being realized by means of the combinations and instrumentalities pointed out in the appended claims.

The invention consists in the novel parts, combinations, and improvements herein shown and described.

The accompanying drawings, referred to herein and constituting a part hereof, illustrate one embodiment of the invention, and together with the description serve to explain the principles thereof.

Figure 1:
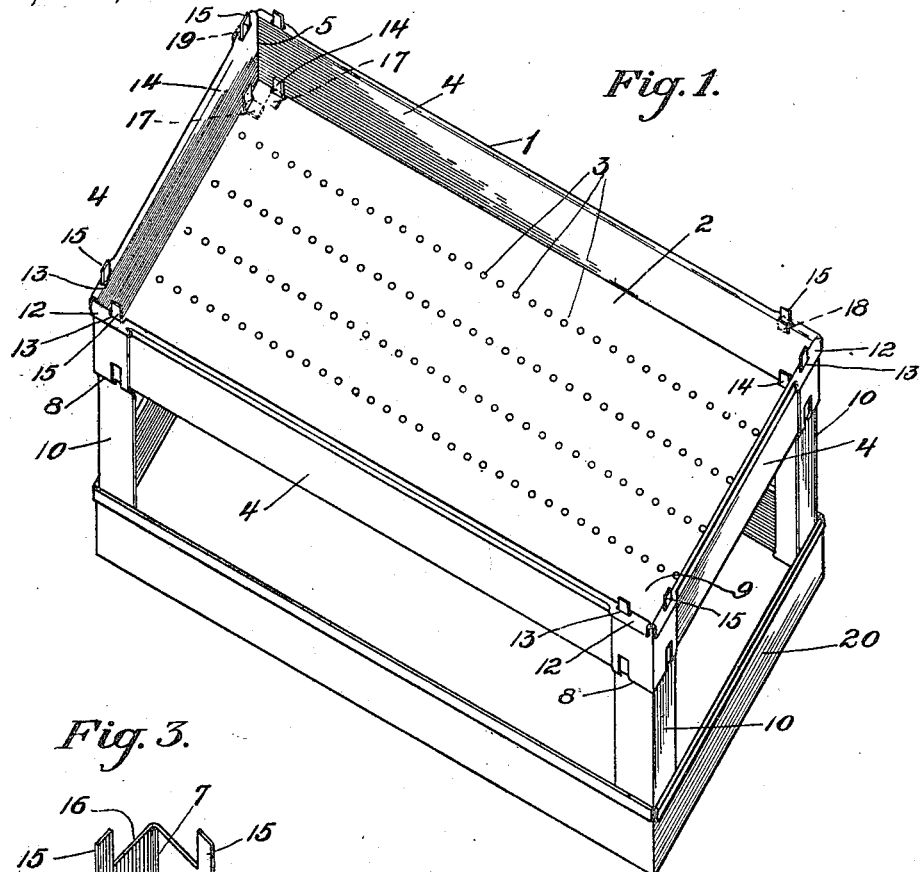
Figure 3:
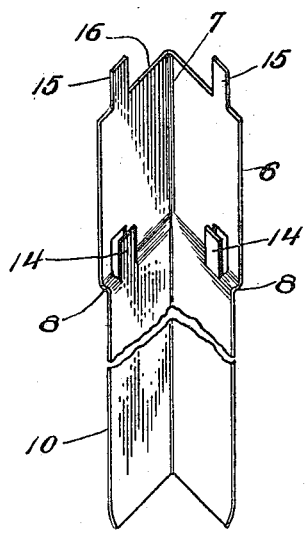
Figure 2:
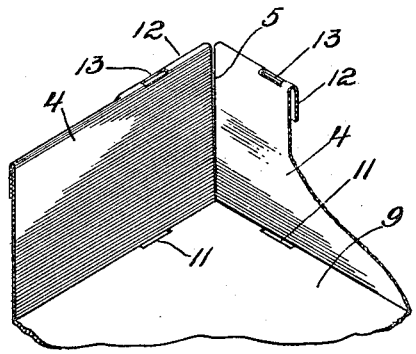

Of the drawings:—Figure 1 is an isometric perspective view of a device embodying the invention; Fig. 2 is a fragmentary isometric perspective, on an enlarged scale, of a corner of one of the pans or trays, showing the slots for the corner piece; and Fig. 3 is an isometric perspective view, on an enlarged scale, of the corner piece and leg.

In the feeding of poultry, particularly in the winter time, it is hygienic and advisable to sprout the grain before it is fed, instead of merely feeding a hard and dry grain, to provide a partly green food to balance their ration. The present invention provides an instrumentality or apparatus for this purpose, which is strong, simple and reliable in construction, easy and economical of manufacture, and which is both durable and handy for use.

The present invention provides a sprouter which is thoroughly staunch and adequate to stand wear and usage, and which is made disassembled for packing and transmission and is thereafter quickly and easily assembled. The device is especially adaptable when disassembled or knocked down for strong and compact packing, especially for transmission by parcel post or express. This is especially desirable with a device of this kind, which is widely distributed through the rural districts. The device is also adapted to provide successive feedings, as for instance upon successive days, the grain for a number of days being soaked periodically to cause it to sprout.

The invention comprises a plurality of superimposed trays or pans, separated from each other so as to permit access of air and light, such pans or trays having preferably perforate bottoms whereby water thrown upon or into the upper tray will run or seep down through the grain upon or within the successive superimposed trays. The lower tray is preferably fluid-retaining or water-tight to prevent the water from running upon the floor or ground.

Referring by way of example to the accompanying drawing, illustrating one embodiment of the invention, trays or pans 1 are shown of preferably rectangular form, the trays or pans, excepting the bottom one, having bottoms 2, with holes or perforations 3 therein. The sides or walls 4 are bent upwardly from the bottom 2. The corners of these walls, or rather the edges thereof, are preferably contiguous or adjacent to each other without being joined together, as shown at 5 in Fig. 2. Such a construction is exceedingly economical of both material and labor, the metal being merely stamped and bent up into the desired form. This also gives compactness in packing for shipping, as the walls 4 of each of two trays facing each other will slip into the recesses 5 of the other tray, respectively, thus occupying the space of one tray.

Means are provided by the invention both for separating the superimposed trays or pans one from another, so as to permit access of light and air between the pans and also, in certain aspects of the invention, such separating and supporting devices for the pans are united with or constitute binding or uniting corner pieces for the adjoining or adjacent side walls. In the embodied form, a corner piece and leg 6 is vertically angled at substantially a right angle, as shown at 7 in Fig. 3, to embrace the adjacent edges of two of the walls 4 where they adjoin at 5, as shown in Figs. 1 and 3. As embodied, the corner pieces 6 have an inwardly offset portion 8 extending across each of the plates or parts formed by the vertical right-angled bend 7. The offset 8 is preferably located so as to fit just beneath the corner edge of the bottom 9 of the pan or tray, there being a portion 10 extending downwardly from the offset portion 8 to constitute legs or spacing devices for the trays, to keep them in superimposed but separated position as already described. Such offset portion not only furnishes a support and seat for the corner of the tray or pan bottom, but the leg portion 10 is thus set or positioned inwardly sufficiently to go easily into the inside of the pan just below. The embodied form of means for attaching the corner piece and leg to its pan or tray has in view the compact packing of the device for transportation before it is assembled, especially for parcel post or express, together with rapid or accurate assembling of the device by the user, in connection with strength and durability for service after being so assembled. In such embodied form slots 11 are provided in the bottom 9 of the pan and close to the bottom edges of the walls 4. The upper edges of the walls 4 near the corners 5 have folded or turned over portions 12, in the upper edges of which there are formed slots 13. In the corner and leg piece, just at the offset 8 are provided tongues 14, which may be cut or punched out of the walls of the corner piece 6, which tongues 14 are adapted to enter the slots 11 in the bottom 9 of the pan or tray. Upon the upper edge of the corner piece 6 are formed also tongues 15, adapted to enter the slots 13, the upper edge 16 of the corner piece passing within the folded portion 12 of the tray walls 4.

In assembling the device, the upper edge 16 of each corner piece is passed within the folded over part 12 of the walls 4, the tongues 15 passing into the grooves 13, and the tongues 14 passing into the slots 11, the offset 8 being preferably just sufficient to take the thickness of the walls 4. When so inserted the upper ends of the tongues 14 are bent downwardly snug against the bottom 2 of the tray, as shown at 17 in Fig. 1, and the ends of the tongues 15 are bent downwardly as shown at 18 in Fig. 1 within the walls 4, or if desired, they may be bent backwardly over the folded over portion 12 as shown at 19 in Fig. 1. When the four corner pieces are thus attached to the tray, it makes a very solid, substantial and permanent device, the device having been put together with the utmost ease and expedition, but being rigid to withstand unlimited reasonable service.

In use preferably the lower pan 20 is fluid containing, that is, its bottom is imperforate and the corners or adjoining edges of the walls are soldered or otherwise made tight, so that it may hold the drips or discharge from the pans or trays above. The legs 10 of the first tray are then set within the pan 20, as shown in Fig. 1, the second tray being set within the first tray in like manner, until the desired number of trays are superimposed or built up. Each tray will have within it a portion of oats or like grain sufficient for a feeding. If water or other fluid be poured upon the grain in the upper tray, it will not only soak the grain in that tray, but will run or seep through and soak the grain in the successive trays, the overplus being caught and held in the bottom tray 20. When the top tray is lifted out, to feed the grain to the poultry, it may be set down, and the successive trays as used may be again built up or superposed upon the first tray as the successive trays are emptied.

When unassembled, or before assembling, two pans or trays may be placed face to face with the walls 4 in the slots 5, as already described, with the corner pieces or legs laid therewithin, and successive groups of such pairs of trays may be made up into a compact, self-protecting bundle for shipment, the erection of the device being rapidly accomplished upon arrival at destination in the manner indicated, such assembling resulting in a simple, efficient and durable structure.

It will be understood that certain changes may be made from the precise illustrated form, within the scope of the accompanying claims, without departing from the principles of the invention and without sacrificing its chief advantages.

What I claim as my invention and desire to secure by Letters Patent is:

1. In a grain sprouter, a pan having slots adjacent to its four corners, and angular supporting and spacing legs embracing the corners of the pan, said legs being provided with struck-up tongues on both of their members, said tongues extending through said slots and bent over into locking connection with the walls of the pan.

2. In a grain sprouter, a pan having slots through its bottom adjacent to the ends of its ends and sides and also having slots in the upper edges of its sides and ends, and angular legs embracing the corners of the pan, said legs being provided with vertically disposed upper and lower tongues on both of their members, said tongues extending through said slots and bent over into locking position.

3. In a grain sprouter, a pan having its upper edge bent outwardly and provided in the bend adjacent to the corners with upper slots and also having slots in its bottom below said upper slots, and legs, said legs being provided with vertically disposed struck-up upper and lower tongues, said tongues extending through said upper and lower slots, respectively, and bent over into locking engagement with the pan.

4. A grain sprouter including in combination a perforate pan to be supported, said pan having its walls bent up but not united, and corner pieces at the corners of the walls serving to tie the adjacent walls together, said corner pieces being vertically angled to embrace the adjacent edges of two walls, and extending downwardly and being bent inwardly to stand within another pan and support the first pan in elevated position therewithin.

5. A grain sprouter including in combination a plurality of superimposed pans, flat, angled supporting legs for a pan, said legs resting within and at the corners of another pan, the upper pan having a perforate bottom, said pan and legs being connected by tongue and slot joints.

6. A grain sprouter including in combination a plurality of superimposed pans, supporting legs for a pan, said legs resting within another pan, the upper pan having water holding sides and a perforate bottom, there being slots formed in said pan and coöperating tongues on said legs extending through the slots and bent over into locking position.

7. A grain sprouter including in combination a plurality of superimposed pans, said pans having a perforate bottom, upwardly turned walls with folded portions at their upper edges, there being slots formed at the bottom of said walls and in said folded portions, corner pieces formed with an offset at the bottom edge of the pan and legs extending downwardly from said offset, said corner pieces having tongues entering the grooves in the bottom and in said folded portions of the pan.

8. In a grain sprouter, a pan, angular legs embracing the corners of the pan, means carried by the legs for detachably connecting the legs to the outer walls of the pan at the upper and lower parts thereof.

9. In a grain sprouter, a pan, angular legs embracing the corners of the pan, means carried by the legs for detachably connecting the legs to the outer walls of the pan at the upper and lower parts thereof, said legs having shoulders formed therein extending underneath the bottom of the pan and carrying the weight of the pan.

In testimony whereof, I have signed my name to this specification, in the presence of two subscribing witnesses.

WALTER H. COLLINS.

Witnesses:
JOHN D. MORGAN,
LOUISA LOEHR.

Copies of this patent may be obtained for five cents each, by addressing the "Commissioner of Patents, Washington, D C."